Nov. 18, 1958   E. JEDRZYKOWSKI ET AL   2,860,717
MOUNTING FOR TRACTOR GENERATOR

Filed Dec. 24, 1954   3 Sheets-Sheet 1

INVENTORS.
EDMUND JEDRZYKOWSKI
CLARENCE A. HUBERT
BY

ATTORNEY

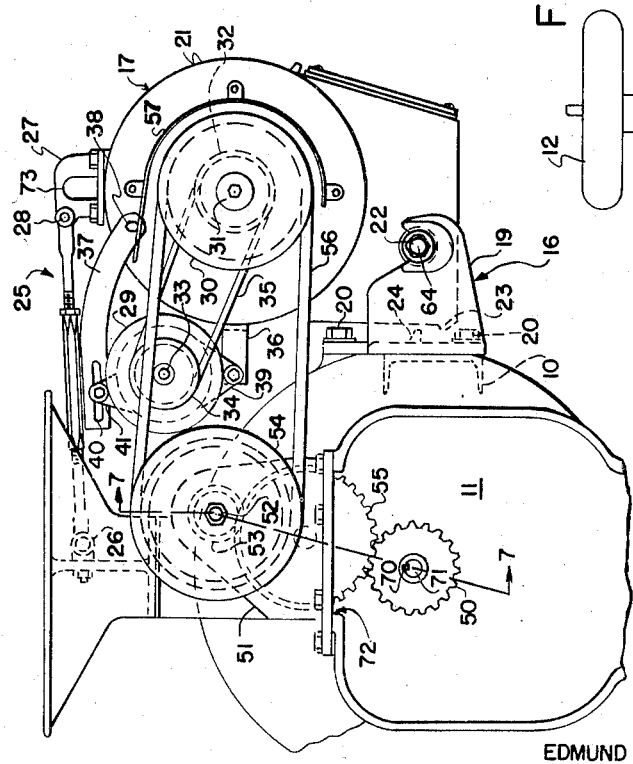

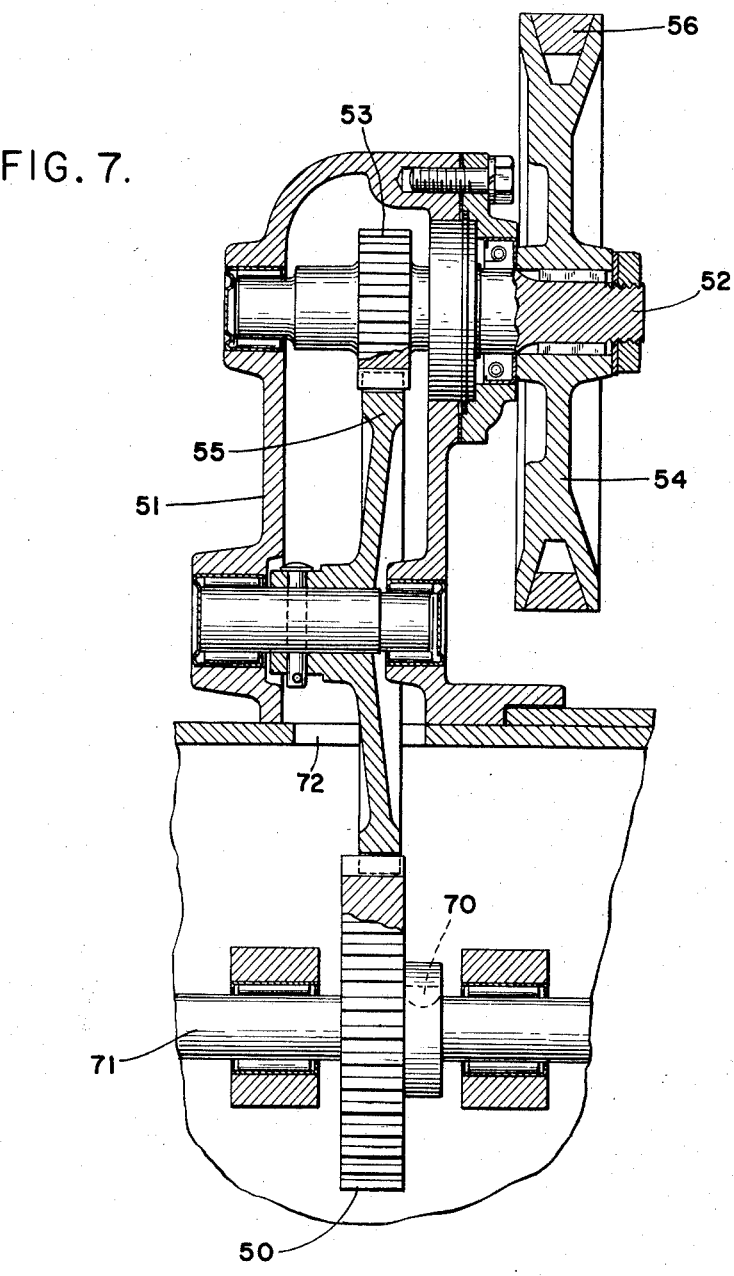

United States Patent Office 2,860,717
Patented Nov. 18, 1958

2,860,717

MOUNTING FOR TRACTOR GENERATOR

Edmund Jedrzykowski and Clarence A. Hubert, Chicago, Ill., assignors to International Harvester Company, a corporation of New Jersey Application December 24, 1954, Serial No. 477,491

3 Claims. (Cl. 180—53)

This invention relates generally to mobile electrical generating equipment, and more specifically to improvements in the mounting of electrical generators to farm type tractors.

Due to the great increases in the use of electrical power on farms, a need has arisen for a farm type tractor with an electrical generator mounted thereon to provide a self-propelled electrical power generating station to furnish electrical current through a flexible cable for such equipment as trailing farm machines, tractor mounted electronic crop disease and insect control apparatus, lighting apparatus and emergency power, and other types of electrically operated equipment.

Therefore, it is the object of this invention to provide a farm type tractor with an electrical generator which may easily be mounted to and removed from the tractor, which is conveniently and efficiently mounted to the tractor for operation by the tractor engine, and which will permit the convenient extension of the power generated by the electrical generator to remotely positioned electrically operated equipment.

Other objects and features of the present invention will be apparent upon a perusal of the following specification and drawings, of which:

Figure 3 is a partial cross sectional view of the structure shown in Figure 1 and taken along the line 3—3;

Figure 4 is an enlarged view of a portion of the structure shown in Figure 1;

Figure 5 is a reduced top plan view of the structure shown in Figure 1;

Figure 7 is a partial view of the structure shown in Figure 3 partially in cross section and taken along the lines 7—7 of Figure 3.

The present embodiment is the preferred embodiment but it is to be understood that changes can be made in the present embodiment by one skilled in the art without departing from the spirit and scope of this invention.

Figure 1:
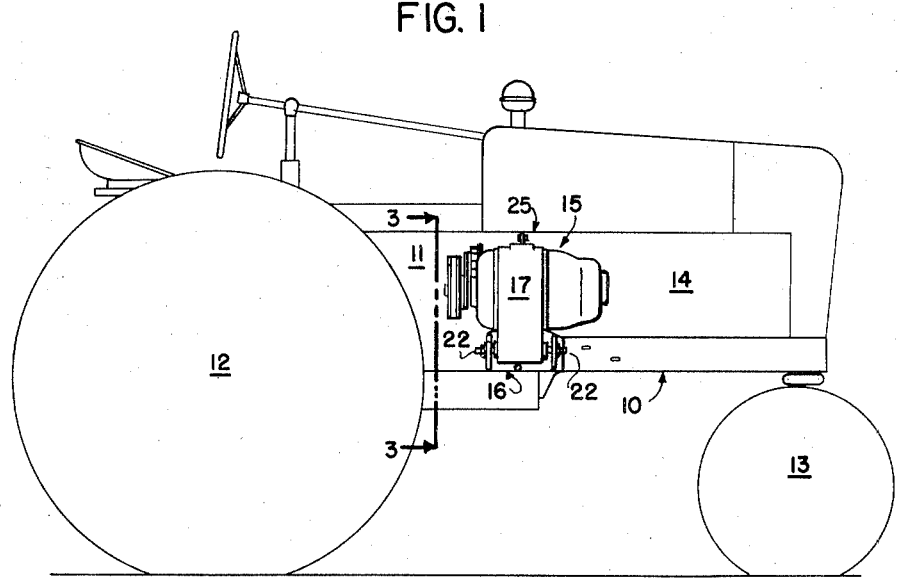
Figure 1 is a side plan view of a farm type tractor with the electrical generator mounted thereto according to this invention.
Figure 2:
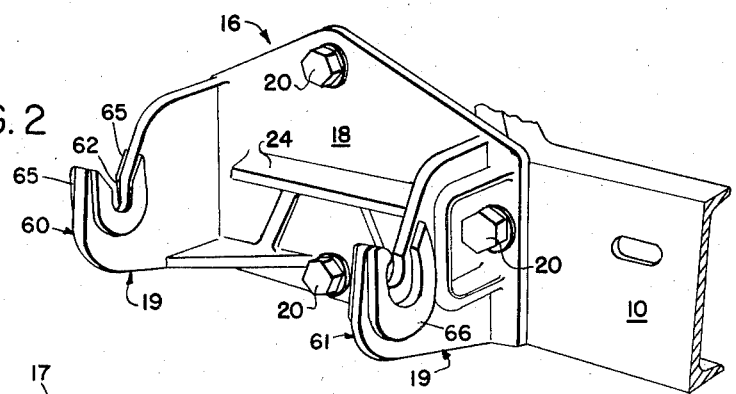
Figure 2 is a perspective view of the mounting bracket for the electrical generator.

For a detailed description of the invention reference is made to the drawings. The farm type tractor, as shown in Figure 1, comprises a unitary structure of a U-shaped channel element 10 and a transmission element 11, supported by rear traction wheels 12 and a steerable front wheel assembly 13. An engine compartment 14 is mounted on the channel-shaped element 10 and contains an internal combustion engine as a power source.

The generator assembly 15 of the subject invention is mounted on one side of the tractor to the channel-shaped element 10. The generator assembly 15 is further mounted substantially adjacent the front end of the transmission section 11 and the rear end of the engine compartment 14, and is positioned between the rear wheels 12 of the tractor. It has been found that the specifically described combination of a tricycle type farm tractor and the generator assembly 15 has many advantages which heretofore have not been obvious in generator mounting assemblies. The generator assembly 15 is conveniently located for easy operation by means connected to the transmission section 11, cable runs from the generator assembly 15 to trail behind farm equipment or tractor mounted equipment is simple and convenient since the generator assembly 15 is cradled between the rear wheels 12 and substantially at the center longitudinally of the tractor between the rear wheels 12 and the steerable front wheel 13, and further, the generator assembly 15 may be easily controlled by the operator of the tractor from his position rearwardly of the transmission section 11.

Figure 6:
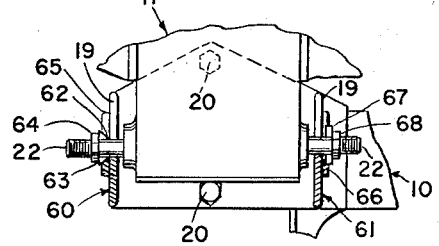
Figure 6 is a partial view of the structure shown in Figure 4 with portions thereof removed.

The generator assembly 15 comprises a bracket 16 for pivotally cradling the generator 17. The bracket 16 is a one-piece casting comprising a back plate portion 18 and two flange portions 19 positioned on the back plate portion 18 at right angles thereto and in a spaced apart relationship to each other. Integrally cast ribs positioned on the back plate portion 18 and between the flange portions 19 serve to reinforce the bracket 16. Each of the flange portions 19 are provided with upwardly opening reinforced hook sections 60 and 61 positioned along a common axis. Each of the hook sections 60 and 61 are ribbed on each side thereof, and the outer rib 65 of one of the hook sections 60 is formed as a conical opening 62 to cooperate with a conical face washer 63 as can be seen in Figure 6. Thus should the nut 64 on shaft 22 loosen slightly in operation, the generator 17 will not be jarred out of the bracket 16 since, with the nut 64 loosened less than the depth of the washer 63, the washer 63 will engage the conical opening 62 to keep the generator 17 within the bracket 16. Further, the outer rib 66 of the other hook section 61 encircles more than half of an opening of a diameter substantially equal to the outer diameter of the washer 67 cooperating therewith. Thus the generator 17 is additionally secured in bracket 16 against an accidental jarring therefrom should the nut 68 on that end of shaft 22 become loosened in operation. The back plate portion 18 is provided with a number of holes therethrough, and the bracket 16 is removably secured to the channel element 10 of the tractor by means of fasteners 20 mounted through these holes. When the bracket 16 is mounted to the channel element 10 of the tractor, the axis through the hook sections 60 and 61 of the flange portions 19 of the bracket 16 is positioned horizontally and longitudinally of the tractor and parallel to the crankshaft of the tractor engine.

The generator 17 comprises a casing 21 within which the field coils and the rotatable armature are mounted and below which outlet plugs (not shown) are provided. The lower portion of the casing 21 is provided with a pair of threaded stub shafts 22 axially aligned and projecting from each side of the bottom portion of the casing 21 as can easily be seen in Figure 4. The bottom portion of the casing 21 is adapted to be positioned between the projecting flange portions 19 of the bracket 16 with the threaded stub shafts 22 engaging the hook sections 60 and 61 of the flange portions 19 of the bracket 16. Further, the threaded stub shafts 22 are mounted on one side of a vertical line through the center of gravity of the generator 17 so that when the stub shafts are positioned within the hook sections 60 and 61 of the projecting flange portions 19 of the bracket 16, as shown in Figure 3, there is a tendency for the generator 17 to pivot about the stub shafts 22 in an outward and downward direction. To limit the arc through which the generator 17 may fall, a flange 23 is formed along the lower marginal edge of the bottom portion of the casing 21 adjacent to the back plate portion 18 of the bracket 16. The flange 23 will engage the rib 24 of the back plate portion 18 of the flange 16 when the generator 17 has fallen through an arc of approximately 20°.

To maintain the generator 17 properly positioned relative to the tractor and to provide means for adjusting the tension in the belt for driving the generator 17, a turnbuckle arrangement 25 is provided. One end of the turnbuckle arrangement 25 is pivotally mounted to the tractor by pivotal mounting means 26. The other end of the turnbuckle arrangement 25 is pivotally mounted to a lug 27 by means of pivotal mounting means 28. The lug 27 is provided with an opening positioned along a vertical line through the center gravity of the generator 17 and above the center gravity thereof, and is bolted to the top of the casing 21 of the generator 17 as can easily be seen in Figures 3 and 4. To pivot the generator 17 toward or away from the tractor, it is merely necessary to adjust the turnbuckle arrangement 25 to a smaller or greater length.

The generator 17 is a belt driven type, and further, is provided with an exciter generator 29 for energizing the field coils of the generator 17. The generator 17 is driven through a pulley 30 which is keyed to the armature shaft 31. The exciter generator 29 is driven from a pulley 32 mounted on the armature shaft 31 of the generator 17. The armature shaft 33 of the exciter generator 29 is provided with a pulley 34 keyed thereto, and a belt 35 is positioned about pulleys 34 and 32. The exciter generator 29 is carried by the casing 21 of the generator 17 by means of a bracket 36 mounted to the casing 21, and an adjusting bracket 37 pivotally mounted to the casing 21 by means of mounting means 38. A flange 39 projecting from the bottom of the exciter generator 29 is pivotally mounted to the bracket 36. The free end of the bracket 37 is provided with a longitudinal slot 40, and a flange 41, mounted to and upstanding from the exciter generator 29, is secured to the free end of the bracket 37 within the slot 40. The point at which the flange 41 is mounted within the slot 40 will determine the amount of tension in the belt 35.

Turning next to a detailed description of the power train interconnecting the tractor engine and the generator 17, reference is particularly made to Figure 3. A gear 50 is keyed at 70 to the crankshaft 71 of the tractor engine substantially adjacent to a vertical plane through pulley 30, and an opening 72 is provided through the upper surface of the transmission section 11 above gear 50. Since the gear 50 is keyed to the crankshaft of the tractor engine, the gear 50 rotates whenever the engine is operating and independently of the tractor transmission. A housing 51 is removably secured over the opening. The upper end of the housing 51 is provided with a bearing through one wall thereof and the shaft 52 is rotatably mounted therein. On the portion of the shaft 52 within the housing 51 a gear 53 is keyed. On the portion of the shaft 52 extending from the housing 51, the pulley 54 is keyed. The pulley 54 is positioned to lie in the same vertical plane as pulley 30. A gear 55 is further provided. The gear 55 is rotatably mounted within the housing 51 with the lower portion thereof projecting below the housing 51. The gear 55 is positioned to mesh with gear 53 and gear 50 when the housing 51 is mounted over the opening in the transmission section 11 as previously described. To complete the power train, a belt 56 is mounted about pulleys 54 and 30. It can easily be seen as previously described, that as the turnbuckle arrangement 25 is lengthened, the tension in belt 56 is increased and as the turnbuckle arrangement 25 is shortened, the tension in belt 56 is decreased.

As a safety measure for this equipment, a guard 57 is provided. The guard 57, which is only shown in Figure 3 and is therein viewed edgewise, is removably mounted to the casing 21 of the generator 17 and projects outwardly therefrom to cover the pulleys 32 and 30.

Turning next to a description of the operation of the instant invention, reference is again made to the drawings. When the engine of the tractor is operating, and means (not shown) for completing the circuits of the exciter generator are completed, the gear 50 is rotated to cause a rotation of gear 55. Gear 55 will in turn rotate gear 53 to rotate the shaft 52 to in turn rotate the pulley 54. The rotating pulley 54 will through the belt 56, causes a rotation of the pulley 30. The rotation of the pulley 30 will through the armature shaft 31 cause a rotation of the armature of the generator 17, and a rotation of the pulley 32. The rotating pulley 32 will through the belt 35 cause a rotation of the pulley 34, and the rotating pulley 34 will through the shaft 33 rotate the armature of the exciter generator 29. The gears 50, 55 and 53, and the pulleys 54, 30, 32 and 34, are so relatively sized as to provide the proper rotational velocity of the armatures of the exciter generator 29 and the generator 17 when the tractor engine is operating at a particular efficient speed.

It can easily be seen that the generator assembly 15 may be easily removed from the tractor. First, it is merely necessary to shorten the turnbuckle arrangement 25 to permit removal of the belt 56. Secondly, any lifting means is mounted through the opening 73 in the bracket 27, and the turnbuckle arrangement 25 is then disconnected from the bracket 27. The fasteners or nuts 64 and 68 mounted on the threaded stub shafts 22 are then loosened, the washers 63 and 67 are moved axially out of cooperation with the ribs 65 and 66 on the hook sections 60 and 61 of the flange portions 19, and the lifting means is operated to lift the generator 17 and the exciter generator 29 out of the bracket 16. A reverse procedure may be easily followed for replacement of the generator 17. To completely remove the generator assembly 15, the bracket 16 may be easily unbolted from the channel element 10, and the housing 51 may be easily unbolted from the transmission section 11, and a cover plate bolted to the transmission section 11 in place of the housing 51.

Having described the invention, what is considered new and desired to be protected by Letters Patent is:

1. A generator mounting arrangement for a tractor comprising: a bracket adapted to be mounted to a frame member of said tractor adjacent the transmission section thereof, said bracket having a back plate portion and two spaced apart projecting flange portions, each of said two projecting flange portions being provided with upwardly opening hook sections, said hook sections positioned along a common axis, the outer surface of one of said hook sections formed to provide a circular conical washer seat, said generator being provided with a pair of stub shafts extending from the lower portion of said generator with said stub shafts positioned along a common axis, each of said stub shafts positioned within one of said hook sections of said bracket, a conical washer mounted about one of said stub shafts and in engagement with said conical washer seat, a fastener mounted on said one stub shaft in engagement with said washer, and a turnbuckle arrangement pivotally mounted between the top of said generator and said tractor.

2. A generator mounting arrangement for a tractor comprising: a bracket adapted to be mounted to a frame member of said tractor adjacent the transmission section thereof, said bracket having a back plate portion and two spaced apart projecting flange portions, each of said two projecting flange portions being provided with upwardly opening hook sections, said hook sections positioned along a common axis, a rib formed about one of said hook sections to encircle more than half of the opening defined by said hook section, a washer having an outer diameter substantially equal to the diameter of the area encircled by said rib and positioned in said area, said generator being provided with a pair of stub shafts extending from the lower portion of said generator with said stub shafts positioned along a common axis, each of said stub shafts positioned within one of said hook portions of said bracket and one of said stub shafts positioned through said washer, and a fastener mounted about said one stub shaft in cooperation with said washer.

3. A generator mounting arrangement for a tractor comprising: a bracket having a back plate portion and two spaced apart projecting flange portions, a longitudinal rib formed on said back plate portion and extending between said projecting flange portions, each of said two projecting flange portions being provided with upwardly opening hook sections, the centers of the openings of said hook sections positioned along a common axis parallel to a longitudinal axis of said rib, said bracket adapted to be mounted to a frame member of said tractor adjacent to the transmission section thereof, said generator being provided with a pair of stub shafts extending from each end of the lower portion of said generator with said stub shafts positioned along a common axis to one side of a vertical line through the center of gravity of said generator, each of said stub shafts positioned within one of said hook sections of said bracket with the center of gravity of said generator disposed outwardly from said bracket, a second rib formed along the lower marginal edge of said generator on the side adjacent said back plate portion of said bracket and spaced from said longitudinal rib so as to engage said longitudinal rib when said generator is pivoted a predetermined angle about the axis of said stub shafts to thereby arrest further rotation of said generator.

References Cited in the file of this patent

UNITED STATES PATENTS

| | | |
|---|---|---|
| 768,392 | Moskowitz | Aug. 23, 1904 |
| 900,522 | Gravell et al. | Oct. 6, 1908 |
| 1,223,673 | Corey | Apr. 24, 1917 |
| 1,242,166 | Fitzgerald | Oct. 9, 1917 |
| 1,747,621 | Dalton | Feb. 18, 1930 |
| 2,168,033 | Johnston et al. | Aug. 1, 1939 |
| 2,304,365 | McCormick | Dec. 8, 1942 |
| 2,392,573 | Brock et al. | Jan. 8, 1946 |
| 2,628,047 | Herder et al. | Feb. 10, 1953 |
| 2,691,740 | Alburtis | Oct. 12, 1954 |

FOREIGN PATENTS

| | | |
|---|---|---|
| 441,868 | France | June 6, 1912 |
| 650,833 | France | Oct. 1, 1928 |